(12) United States Patent
Hunter et al.

(10) Patent No.: US 11,388,863 B2
(45) Date of Patent: Jul. 19, 2022

(54) ADAPTIVE LIGHTING SYSTEM FOR AN INDOOR GARDENING APPLIANCE

(71) Applicant: Haier US Appliance Solutions, Inc., Wilmington, DE (US)

(72) Inventors: Matthew Hunter, Louisville, KY (US); Michael Goodman Schroeder, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 274 days.

(21) Appl. No.: 16/580,163

(22) Filed: Sep. 24, 2019

(65) Prior Publication Data

US 2021/0084836 A1    Mar. 25, 2021

(51) Int. Cl.
*A01G 9/24* (2006.01)
*A01G 7/04* (2006.01)
*A01G 9/26* (2006.01)
*A01G 31/06* (2006.01)
*H05B 47/105* (2020.01)

(52) U.S. Cl.
CPC ............ *A01G 9/249* (2019.05); *A01G 7/045* (2013.01); *H05B 47/105* (2020.01); *A01G 9/26* (2013.01); *A01G 31/06* (2013.01)

(58) Field of Classification Search
CPC .......... A01G 9/249; A01G 7/045; A01G 9/26; A01G 31/06
See application file for complete search history.

(56) References Cited

U.S. PATENT DOCUMENTS

| | | | |
|---|---|---|---|
| 5,956,897 A | 9/1999 | Takashima | |
| 7,832,142 B1 | 11/2010 | Olson | |
| 8,869,447 B2 | 10/2014 | Benfey et al. | |
| 9,357,714 B2 | 6/2016 | Knaap et al. | |
| 9,974,243 B2 | 5/2018 | Martin | |
| 10,055,117 B2 | 8/2018 | Kim et al. | |
| 10,729,080 B2 * | 8/2020 | Staffeldt | A01G 31/02 |
| 2011/0115385 A1 * | 5/2011 | Waumans | A01G 7/045 |
| | | | 315/152 |
| 2019/0029201 A1 | 1/2019 | Griffin | |

(Continued)

FOREIGN PATENT DOCUMENTS

| | | |
|---|---|---|
| CN | 105519424 A | 4/2016 |
| CN | 205756216 U | 12/2016 |

(Continued)

*Primary Examiner* — Monica L Barlow
*Assistant Examiner* — Madeline L Douglas
(74) *Attorney, Agent, or Firm* — Dority & Manning, P.A.

(57) ABSTRACT

An indoor gardening appliance includes a liner defining a grow chamber and a grow module mounted within the grow chamber for receiving a plurality of plant pods. A lighting assembly is positioned within the grow chamber and includes a plurality of lights that are independent movable and adjustable. A controller detects an abnormal growth condition, e.g., a plant growing in a single direction, the presence and location of bare or void regions within a particular plant, growth toward a pinch point, and other growth abnormalities. The lighting assembly may be adjusted to correct the abnormal grow condition, e.g., by modifying an illumination schedule, an illumination direction, an intensity, a wavelength, or another parameter of the generated light.

20 Claims, 11 Drawing Sheets

(56) References Cited

U.S. PATENT DOCUMENTS

| | | |
|---|---|---|
| 2019/0075741 A1 | 3/2019 | Olesen et al. |
| 2019/0082620 A1 | 3/2019 | Griffin |
| 2019/0114935 A1 | 4/2019 | Nolan et al. |
| 2019/0259108 A1* | 8/2019 | Bongartz .............. A01C 21/005 |
| 2020/0084983 A1* | 3/2020 | Liang ................. B01D 53/0407 |

FOREIGN PATENT DOCUMENTS

| | | | |
|---|---|---|---|
| CN | 206165391 U | 5/2017 | |
| CN | 108055734 A * | 5/2018 | ............. H05B 45/22 |
| CN | 108255213 A * | 7/2018 | |
| CN | 108651075 A | 10/2018 | |
| JP | 2012085586 A | 5/2012 | |
| KR | 101954237 B1 | 3/2019 | |
| RU | 2061371 C1 | 6/1996 | |
| RU | 2127874 C1 | 3/1999 | |
| WO | WO2012100482 A1 | 8/2012 | |
| WO | WO2018068042 A1 | 4/2018 | |
| WO | WO2018158093 A1 | 9/2018 | |
| WO | WO-2018231409 A1 * | 12/2018 | ............. A01G 25/16 |
| WO | WO-2019237203 A1 * | 12/2019 | ......... G06Q 10/0639 |

\* cited by examiner

ADAPTIVE LIGHTING SYSTEM FOR AN INDOOR GARDENING APPLIANCE

FIELD OF THE INVENTION

The present subject matter relates generally to systems for gardening plants indoors, and more particularly, to systems and methods for illuminating plants within an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional indoor gardens centers typically include a lighting system for illuminating plants stored therein to facilitate the photosynthesis process. For example, typical garden centers have one or more lights that are turned on at desired times to encourage plant growth. However, such lighting systems are typically passive, time-based lighting systems that simply turn on and off at specified times. These systems operate according to a rigid schedule, and do not adapt to certain environmental conditions or in response to actual plant growth. These passive systems provide no way to correct for abnormal growth conditions, such as excessively directional growth, growth toward pinch points, etc.

Accordingly, and improved indoor garden center would be useful. Particularly, an indoor garden center with a lighting system that facilitates healthy plant growth with plants growing evenly and fully while remaining away from pinch points would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided, including a liner positioned within a cabinet and defining a grow chamber, a grow module mounted within the liner and defining a root chamber, and a plurality of apertures defined through the grow module, the plurality of apertures being configured for receiving a plurality of plant pods that grow a plurality of plants. A growth detection system is provided for detecting plant growth of the plurality of plants and a lighting assembly selectively illuminates one or more portions of the plurality of plants. A controller is in operative communication with the growth detection system and the lighting assembly and is configured for detecting an abnormal growth condition of the plurality of plants using the growth detection system and adjusting the lighting assembly to correct the abnormal growth condition of the plurality of plants.

In another exemplary embodiment, a method of illuminating a plurality of plants within a gardening appliance is provided. The method includes detecting an abnormal growth condition of the plurality of plants using a growth detection system and adjusting a lighting assembly to correct the abnormal growth condition of the plurality of plants.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
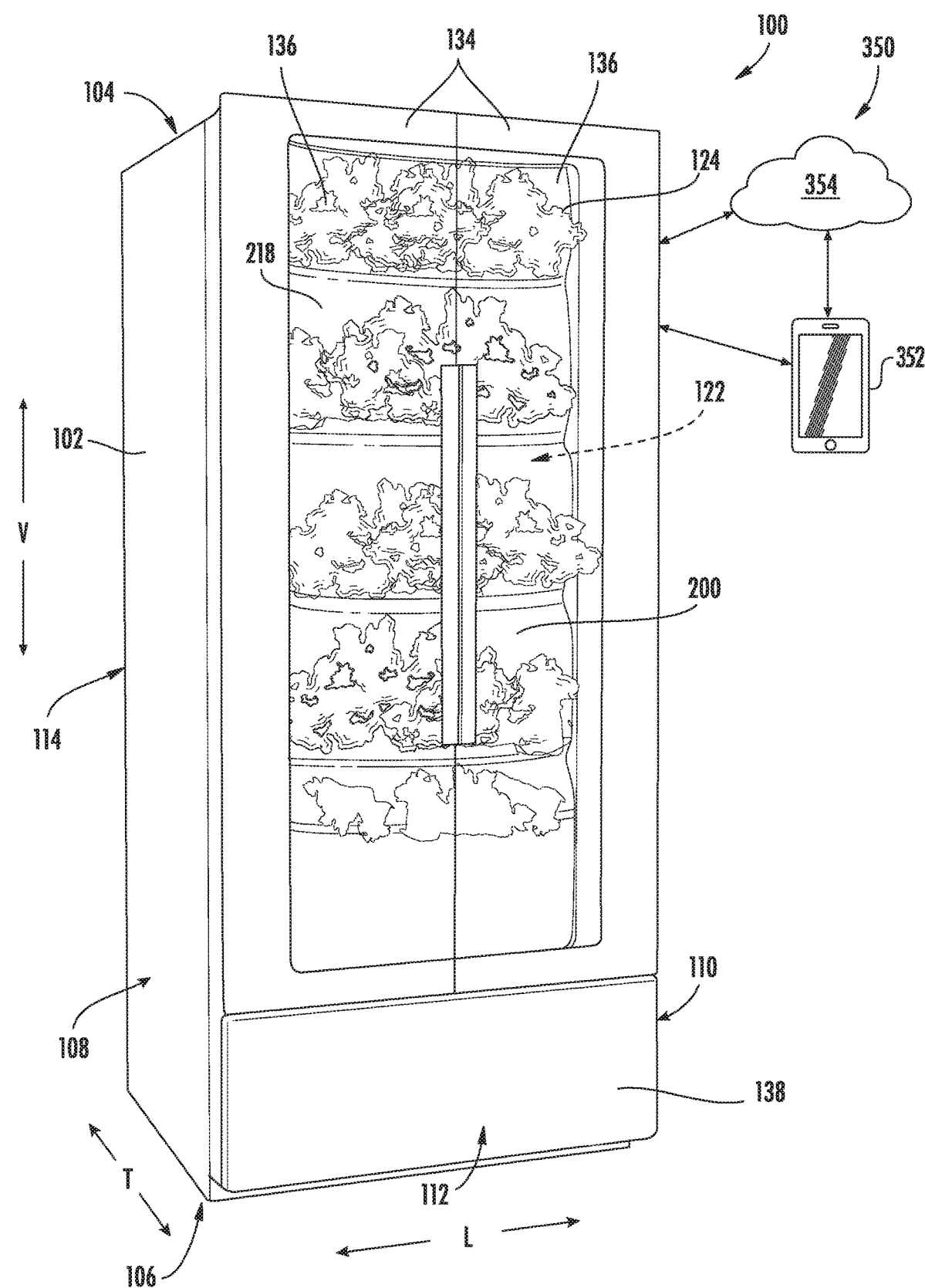
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
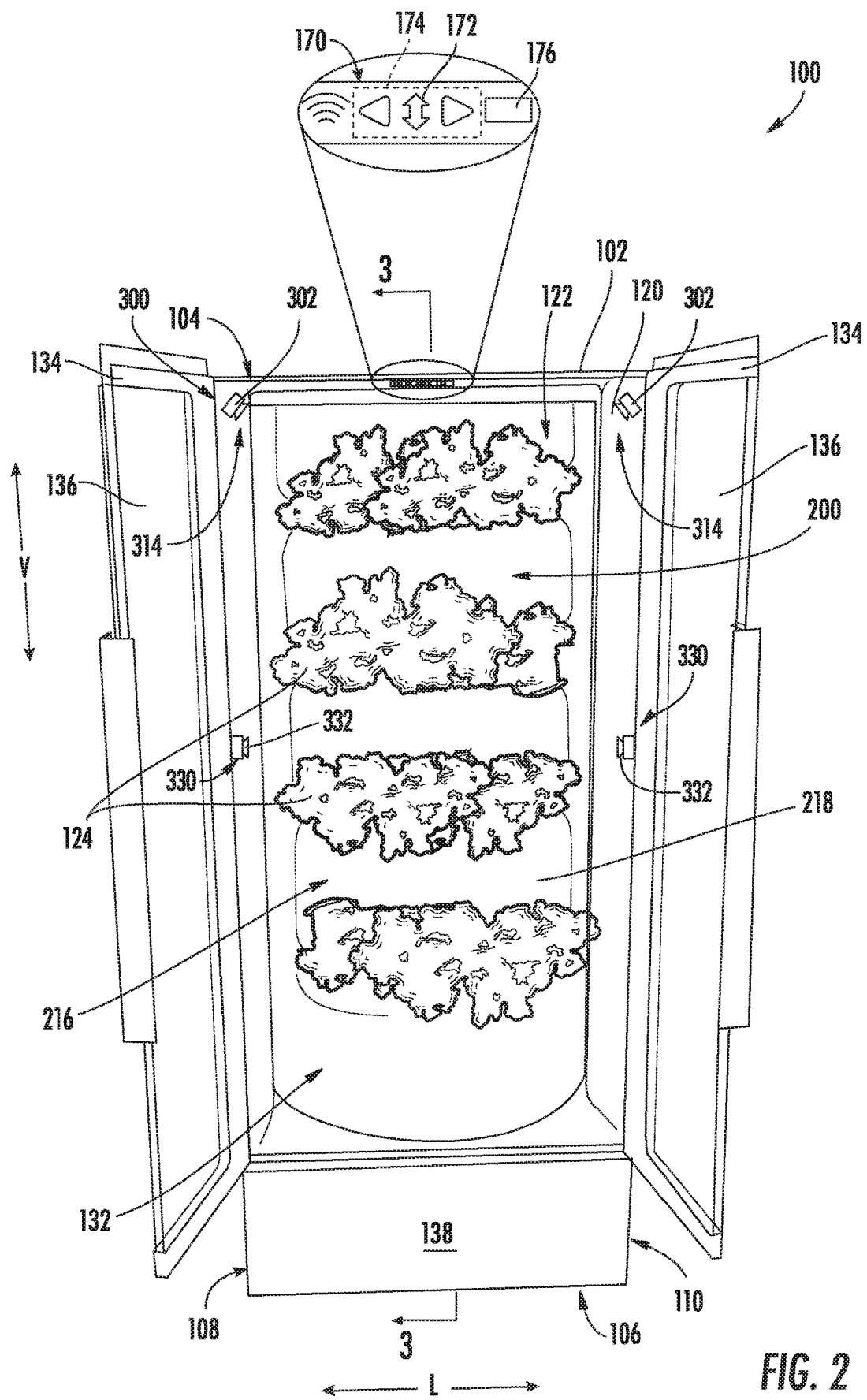
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
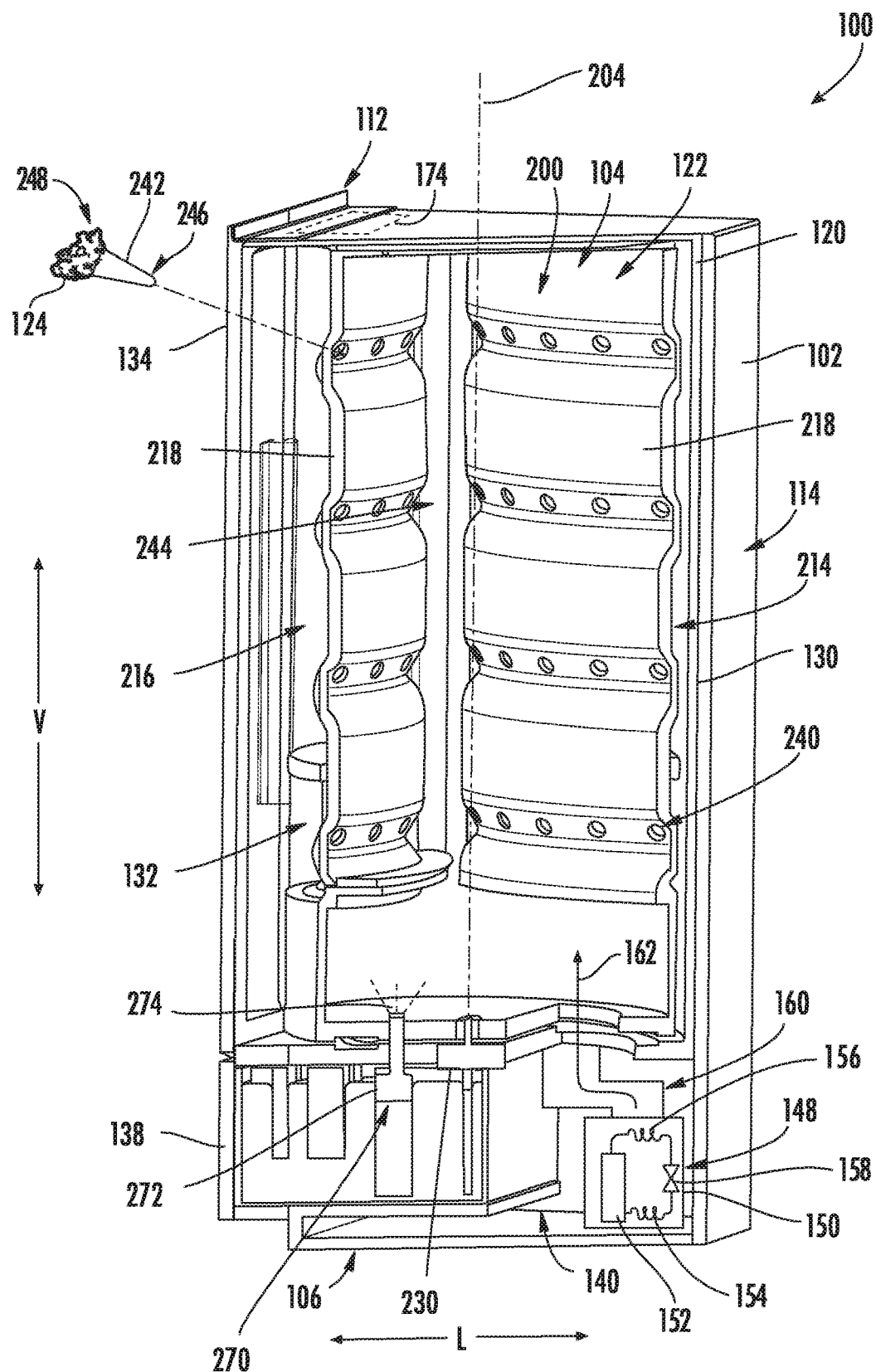
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

According to still other embodiments, grow module 200 may include one or more sealing elements 224 positioned on a radially distal end of each of partitions 206. In this regard, sealing elements 224 may extend from partitions 206 toward liner 120 to contact and seal against liner 120. For example, according to the illustrated embodiment, sealing elements 224 are wiper blades formed from silicone or another suitably resilient material. Thus, as grow module 200 rotates, sealing elements 224 slide against liner 120 to substantially seal each of the plurality of chambers 210. It should be appreciated that as used herein, the term "substantial seal" and the like is not intended to refer to a perfectly airtight junction. Instead, this term is generally used to refer to an environment which may be regulated independently of adjacent environments to a reasonable degree. For example, if plants 124 and the first chamber 212 prefer a 10° F. increase in temperature relative to plants 124 and second chamber 214, the substantial seal between these two chambers may facilitate such temperature difference.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
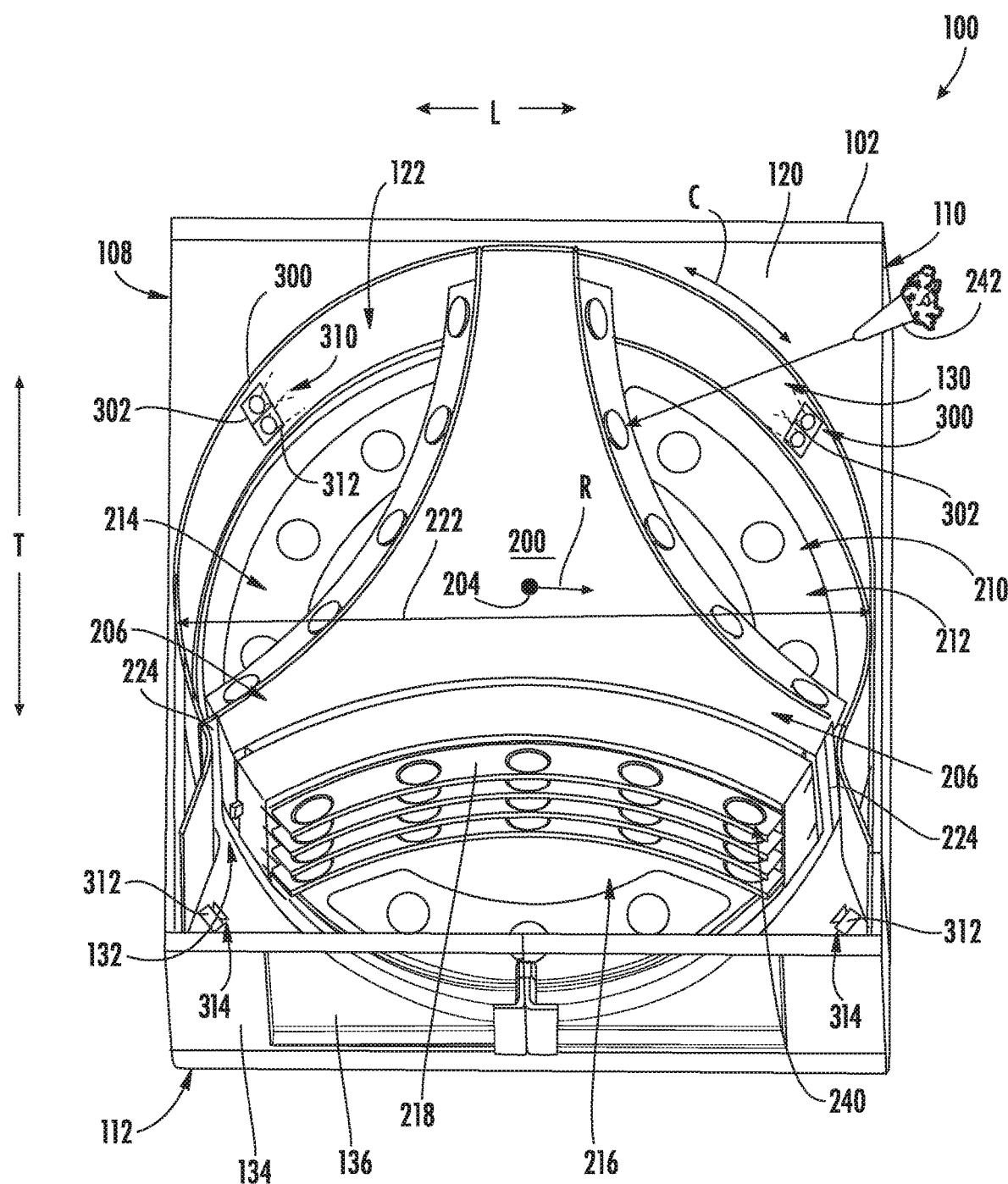
FIG. 4 is a top perspective view of the exemplary gardening appliance of FIG. 1, with the top panel of the cabinet removed to reveal a rotatable grow module according to an exemplary embodiment of the present subject matter.
Figure 5:
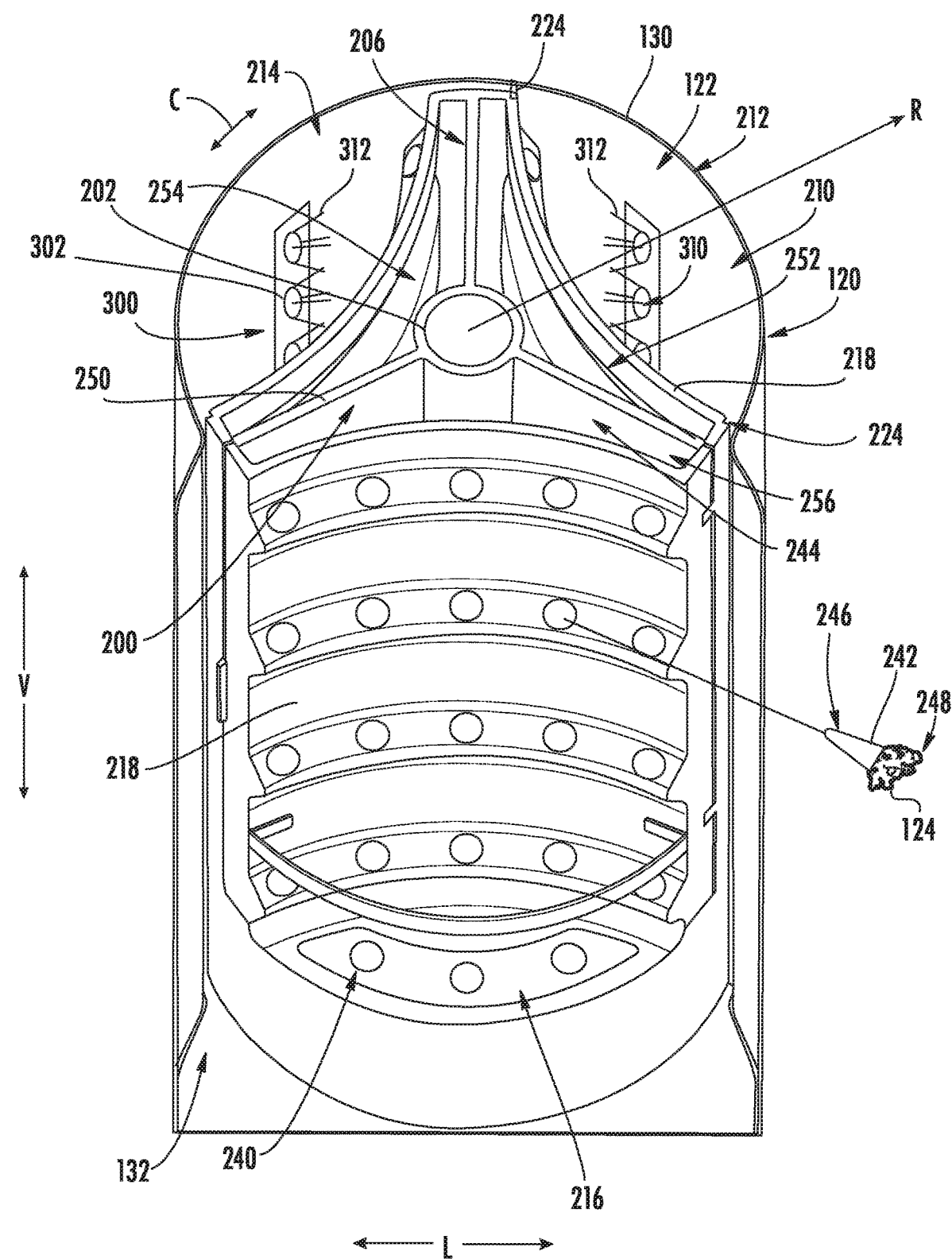
FIG. 5 provides a perspective cross sectional view of the exemplary gardening appliance of FIG. 1 according to another exemplary embodiment of the present subject matter.
Figure 6:
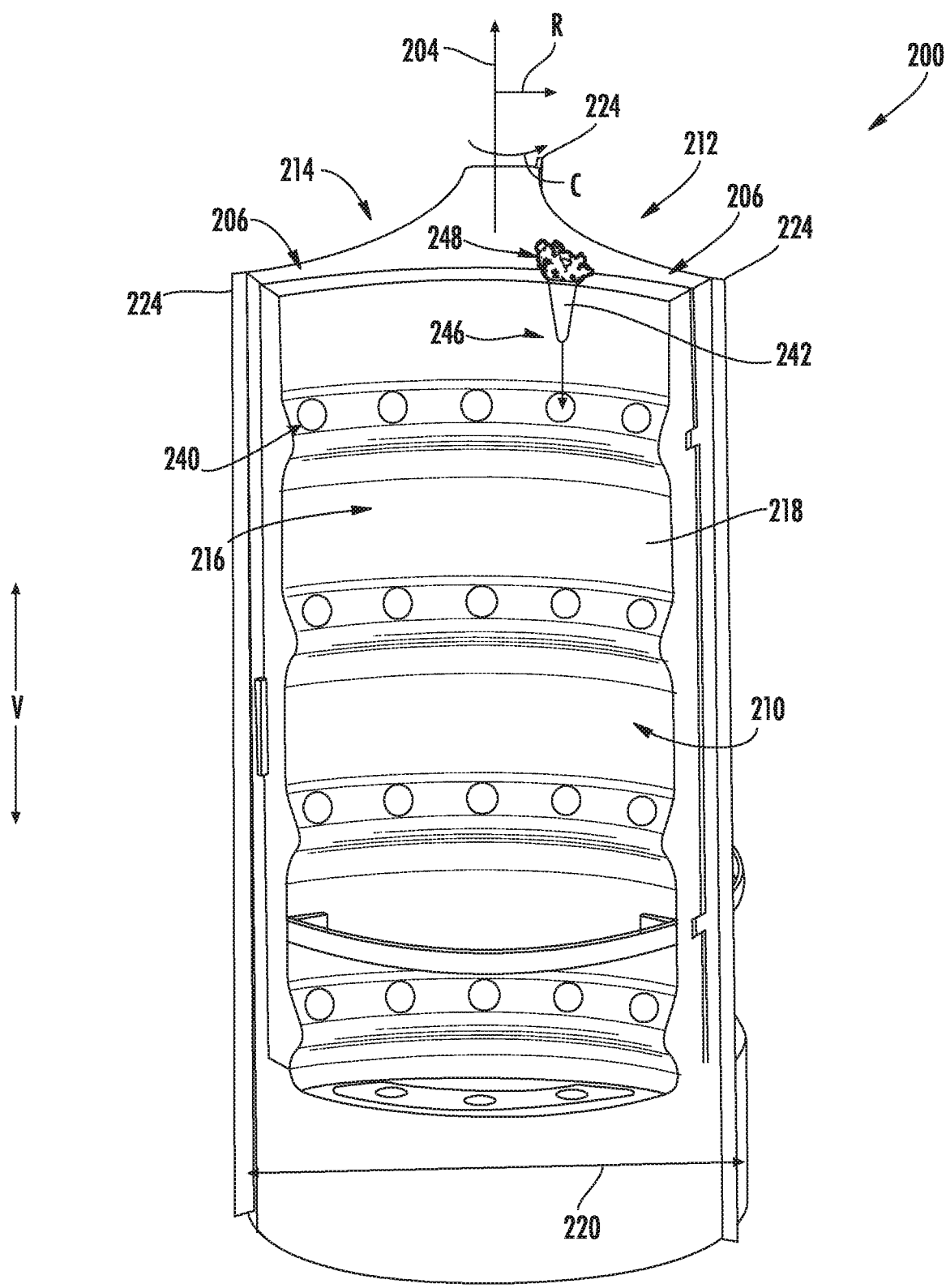
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
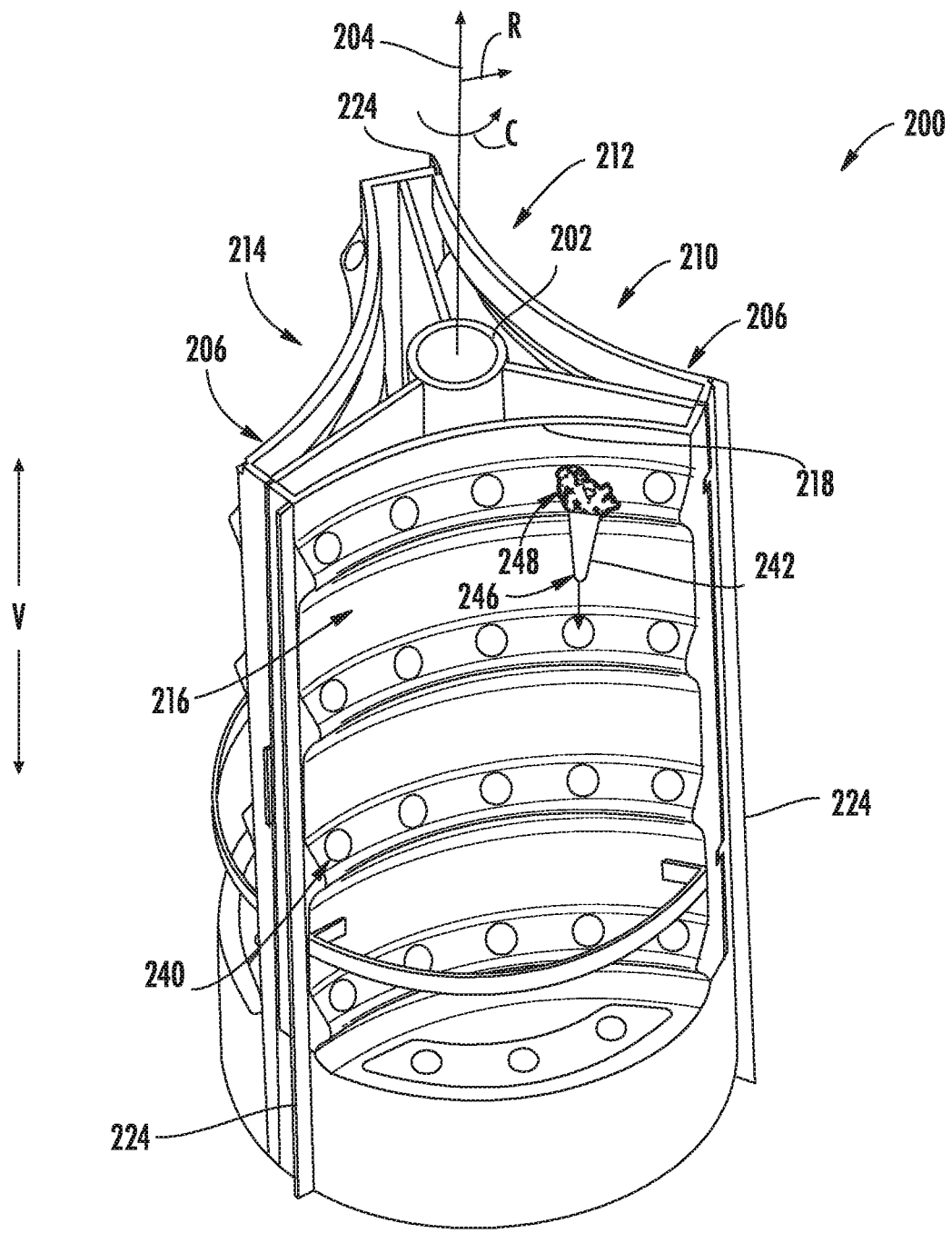
FIG. 7 provides a perspective cross sectional view of the exemplary grow module of FIG. 6 according to another exemplary embodiment of the present subject matter.
Figure 8:
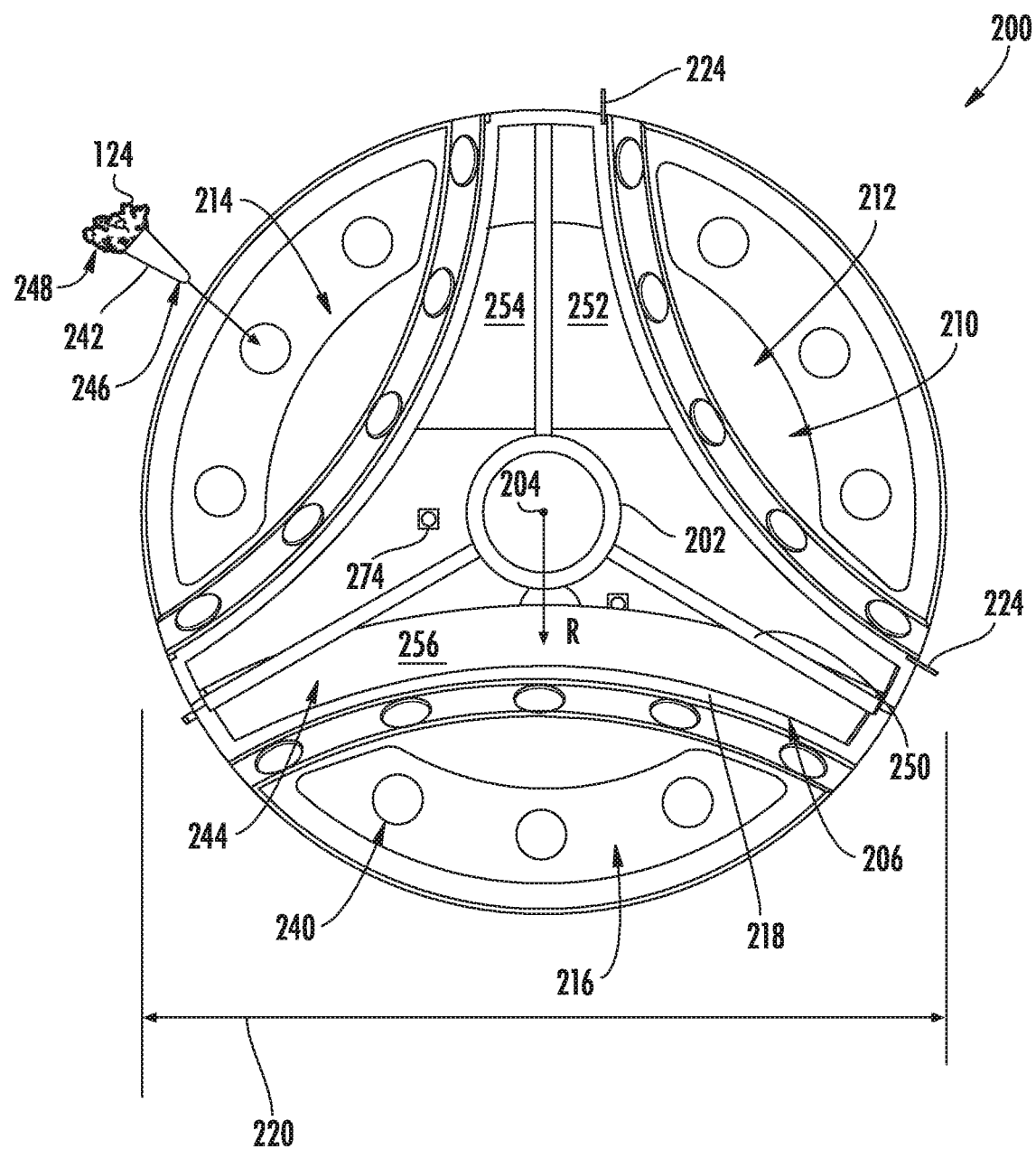
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now for example to FIGS. 4, 5, 9 and 10, gardening appliance 100 may further include a lighting assembly 300 which is generally configured for providing light into selected chambers 210 to facilitate photosynthesis and growth of plants 124. In addition, as will be described in more detail below, lighting assembly 300 may further be used to correct abnormal growth conditions of plants 124 positioned within gardening appliance 100. In this regard, lighting assembly 300 may be used to illuminate a region of plants 124 or particular portions of plants 124 to facilitate growth of those plants 124 in desired directions or at specific rates, e.g., to facilitate the full and healthy growth of all plants 124 within gardening appliance 100.

Figure 9:
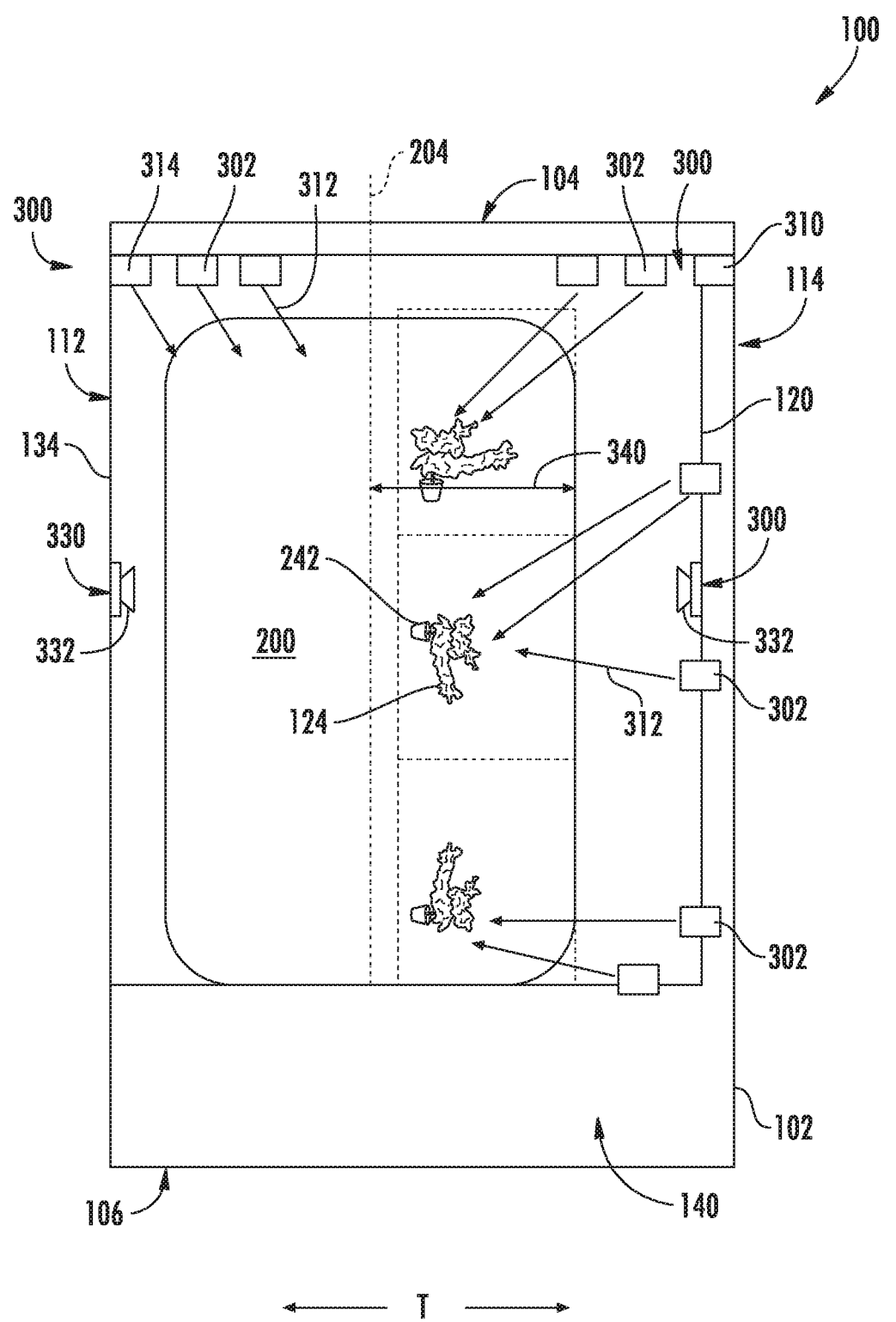
FIG. 9 provides a schematic view of lighting assembly that may be used with the exemplary gardening appliance of FIG. 1 for illuminating a grow chamber according to an exemplary embodiment of the present subject matter.

As shown, lighting assembly 300 may include a plurality of light sources 302 positioned throughout grow chamber 122 for illuminating regions of grow chamber 122 for any suitable purpose. For example, as shown in FIGS. 4 and 5, lighting assembly 300 may include rear light arrays 310, positioned in one or both rear quadrants of grow chamber 122, e.g., positioned for illuminating enclosed back portion 130 of grow chamber 122. In other words, rear light arrays 310 are generally positioned for illuminating the chambers 212-216 that are in the sealed position. As shown in FIGS. 4, 5, and 9, rear light arrays 310 include a plurality of light sources 302 stacked in a vertical array, e.g., extending along the vertical direction V. According to an alternative embodiment illustrated in FIG. 10, light sources 302 are also spaced apart along the circumferential direction. For example, light sources 302 may be mounted directly to liner 120 within grow chamber 122, or may alternatively be positioned behind liner 120 such that light is projected through a transparent window or light pipe into grow chamber 122. It should be appreciated that these are exemplary lighting configurations and that according to alternative embodiments, any other suitable number, type, position, and configuration of light sources 302 may be used while remaining within the scope of the present subject matter.

Notably, light energy generated from rear light arrays 310 (identified herein generally by reference numeral 312) is frequently the very bright and may result in light pollution within a room where gardening appliance 100 is located. Therefore, rotating grow module 200 may be positioned in a manner that reduces or eliminates light pollution from rear light arrays 310 through front display opening 132. Specifically, as illustrated, rear light arrays 310 are positioned only within the enclosed back portion 130 of liner 120 such that only chambers 210 which are in a sealed position are exposed to light 312 from rear light arrays 310. Specifically, grow module 200 acts as a physical partition between rear light arrays 310 and front display opening 132. In this manner, as illustrated for example in FIG. 5, no light may pass from first chamber 212 or second chamber 214 through grow module 200 and out front display opening 132. As grow module 200 rotates, two of the three grow chambers 210 will receive light from rear light arrays 310 at a time. According still other embodiments, a single rear light array 310 may be used to reduce costs, whereby only a single grow chamber 210 will be lit at a single time.

As used herein, light sources 302 may refer to any suitable number, type, position, and configuration of electrical light source(s), using any suitable light technology and illuminating in any suitable color. For example, according to the illustrated embodiment, light source 302 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 302 may include any other suitable traditional light bulbs or sources, such as halogen bulbs, fluorescent bulbs, incandescent bulbs, glow bars, a fiber light source, etc. It should be appreciated that each light source 302 may be independently movable, pivotable, and adjustable to direct light 312 as desired within grow chamber 122.

In addition to rear light arrays 310, lighting assembly 300 may include display lighting 314 that includes one or more light sources 302 positioned for illuminating a front portion of grow chamber 122, e.g., for illuminating chambers 212-216 when in the display position. Similar to rear light arrays 310, display lighting 314 may include any suitable number, position, and type of light sources 302 for illuminating particular regions or locations within grow chamber 122.

Specifically, as shown for example in FIG. 9, display lighting 314 may include a plurality of independently movable light sources 302 positioned on liner 120 proximate top 104 of cabinet 102. These light sources 302 may be selectively illuminated to direct light into a specific region or onto a specific portion of plants 124 within grow chamber 122.

In general, lighting assembly 300, including rear light arrays 310 and display lighting 314, may be used to selectively illuminate one or more portions of plants 124, e.g., to correct an abnormal growth condition of one or more of the plurality of plants 124. As used herein, the term "abnormal growth condition" is intended generally to refer to any undesirable growth of plants 124 within grow chamber 122. As will be explained in more detail below, gardening appliance 100 includes features for detecting such abnormal growth conditions, such that controller 174 may implement corrective action to correct such conditions and provide a healthier growing environment for all plants 124.

Specifically, according to exemplary embodiments, gardening appliance 100 may include a growth detection system 330 which is generally configured for monitoring grow chamber 122 and plants 124 located therein. In this regard, according to the illustrated embodiment, growth detection system 330 may include a camera system 332 which is generally configured for monitoring the growth, size, health, or other features of plants 124 positioned within grow chamber 122. Camera system 332 may generally include any suitable number of cameras or optical detection devices positioned at any suitable locations within grow chamber 122 for monitoring plants 124. In addition, camera system 332 may include multiple cameras spaced apart within grow chamber 122 for monitoring plant growth from multiple angles.

According to alternative embodiments, growth detection system 330 may include other plant monitoring systems or detection devices. For example, growth detection system 330 may rely on other suitable sensors, such as a proximity detection system, that may include a sonar system or devices, a laser imaging, detection, and ranging (LiDAR) system, a radar system, or another acoustic or optical distance sensor. These systems may generally rely on sound waves, light waves, or other monitoring of electromagnetic energy to monitor the precise growth of each plant 124, the position of particular plant pods 242, or any other data indicative of plant growth which may be useful to user.

According to still other embodiments, controller 174 may approximate plant growth, e.g., based on empirical data regarding growth rates and grow times of a particular plant 124. For example, controller 174 may have knowledge of when a particular plant pod 242 was inserted into grow chamber 122 and may further have knowledge regarding growth rates of the associated plants 124 based on the provided nutrient schedules, light schedules, and/or growing environment within grow chamber 122. Using this information, controller 174 may make an informed decision on the size and position of a particular plant and may use that information diagnose or identify abnormal growth conditions.

In general, growth detection system 330 may be in operative communication with controller 174 (e.g., or another dedicated system controller) for monitoring growth of plants 124. Specifically, growth detection system 330 may be used to detect an abnormal growth condition plants 124, e.g., using camera system 232 or a proximity detection system. In addition, controller 174 may adjust lighting assembly 300 to correct the abnormal growth condition of plants 124 or may further provide a user notification when the abnormal growth condition occurs such that corrective action may be taken. For example, according to one exemplary embodiment, a user notification may include instructions related to user manipulation or pruning of plants 124.

According to exemplary embodiments, the abnormal growth condition may include conditions where a general shape of the plant or some quantification of that shape, such as the roundness, sphericity, or perimeter-to-area ratio of the plurality of plants 124 or a single plant 124. In this regard, controller 174 may be configured for analyzing image data obtained by camera system 332 or proximity data obtained by proximity detection system or growth detection system, and may trigger an abnormal growth condition when these measured parameters fall outside a specific quantitative threshold or reach a certain qualitative threshold.

In this regard, for example, the term "sphericity" is generally intended to refer to a measure of the spherical shape of a plant 124. Specifically, the sphericity of a plant 124 may be of value between zero and one, with a perfect sphere having a sphericity value of 1. Thus, for example, if the sphericity of a plant 124 drops below a particular threshold, such as 0.8, 0.6, 0.4, or lower, controller 174 may regulate lighting assembly 300 to correct the sphericity, i.e., to increase the sphericity, resulting in a more rounded or spherical plant 124 having more foliage exposed to lighting. Such plants 124 may ultimately grow into a healthier plant 124. Similarly, plant monitoring may be based on a 2-D image of plants 124, e.g., by determining an average perimeter-to-area ratio or a mathematical roundness of a particular plant 124.

Figure 10:
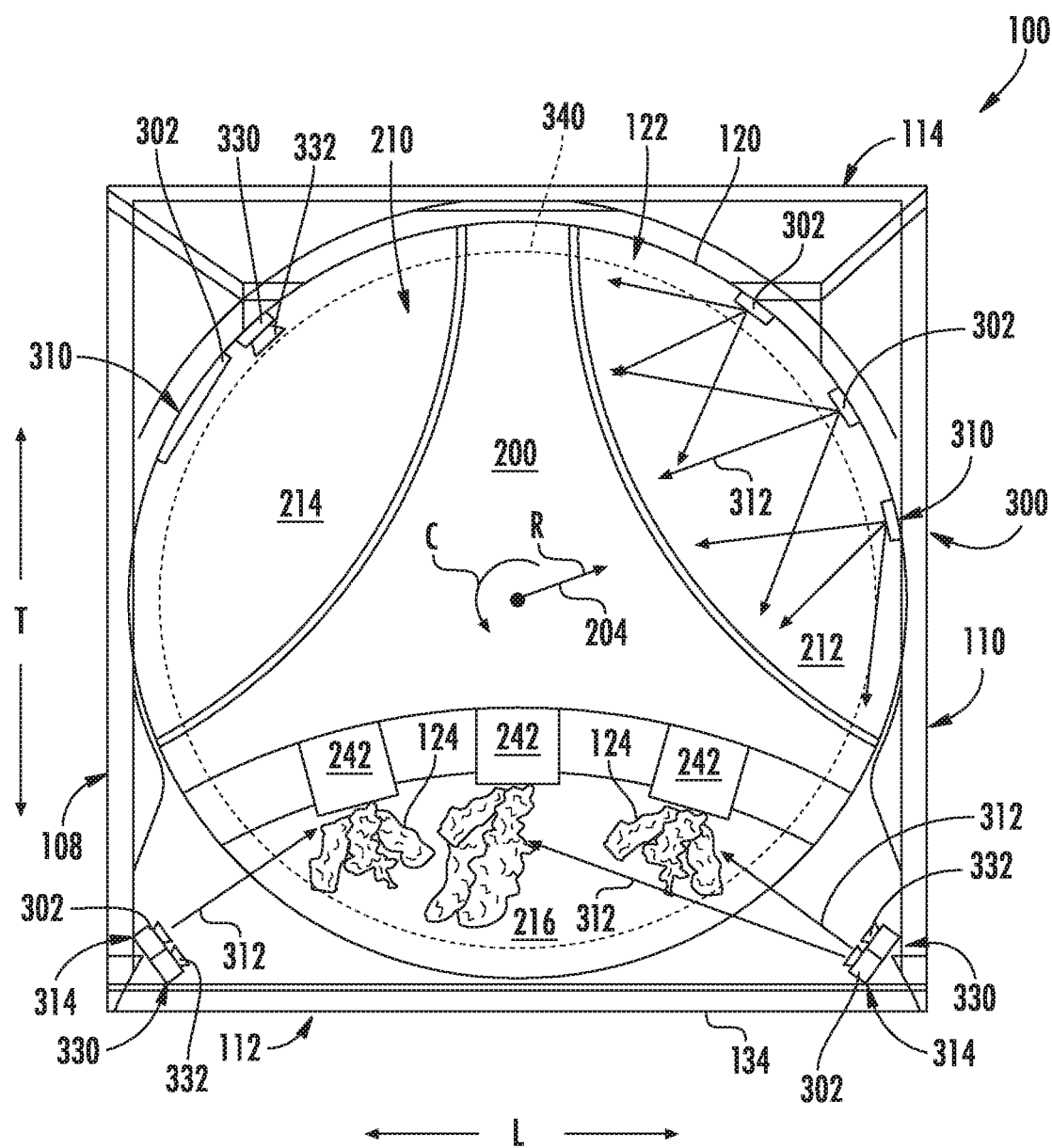
FIG. 10 provides a top schematic view of a lighting assembly that may be used with the exemplary gardening appliance of FIG. 1 for illuminating a grow chamber according to an exemplary embodiment of the present subject matter.

According to still other embodiments, and as specifically illustrated in FIG. 10, an abnormal growth condition may occur when one or more of the plurality of plants 124 grow beyond a predetermined radial distance measured from a central axis 204 of grow module 200. In this regard, a virtual radial threshold 340 may be defined within a horizontal plane in grow chamber 122 and may be monitored by growth detection system 330. When one or more plants 124 cross the radial threshold 340, controller 174 may identify the abnormal growth condition and begin implementing corrective action to adjust the growth direction of the foliage of plants 124. In severe situations, controller 174 may further be configured for providing a user notification and/or illuminating the portions of plant 124 that have grown undesirably with a particular color light that indicates to a user that pruning is needed.

In addition to identifying abnormal growth conditions, growth detection system 330 may be used to provide visual feedback to a user regarding such growth conditions, such that corrective action may be taken. For example, growth detection system 330 may operate display lighting 314, e.g., for precision indication or illumination of particular regions of a plant 124 that need pruning for harvesting. For example, as shown in FIG. 10, light sources 302 of display lighting 314 may be positioned in a vertical array at front corners of cabinet 102. In addition, light sources 302 may be pivotable along two or more axes to direct light 312 at any suitable location. In addition, the focus of such light sources 302 may be varied to provide pinpoint lighting, e.g., for identification of a particular leaf of a particular plant 124.

In addition to providing light 312 to a particular region or portion of plant 124, lighting assembly 300 may vary generation of light energy 312 in other ways for other specific purposes. For example, light source 302 may vary in color, wavelength, intensity, or according to a particular illumination schedule. For example, if a particular plant responds better to a particular wavelength or illumination schedule of light, controller 174 and may regulate lighting assembly 300 to provide such illumination. Other lighting schemes and purposes are possible and within the scope of the present subject matter.

According to still another exemplary embodiment, lighting assembly 300 may be configured to simulate environmental lighting. For example, in nature, plants are exposed to varying levels of light energy throughout the day and night. Thus, lighting assembly 300 may be configured to simulate those environmental conditions by providing light according to an illumination schedule, e.g., selected based on the native environment of a particular plant. In addition, environmental control system 148 may simulate environmental conditions such as the temperature and humidity experienced by a particular plant in its natural environment. Moreover, lighting assembly 300 and the environmental control system 148 may operate independently of or in conjunction with motor 230 as it rotates grow module 200 between different regions within grow chamber 122. For example, grow module 200 may be rotated to turn plants 124 away from or toward light sources 302 at particular times to simulate a rising or setting sun, or to simulate other environmental conditions. Other methods of using environmental control system 148 and lighting assembly 300 to simulate native environmental conditions of a particular plant are possible and within the scope of the present subject matter.

In addition, referring again to FIG. 1, gardening appliance 100 may generally include an external communication system 350 which is configured for enabling the user to interact with gardening appliance 100 using a remote device 352. Specifically, according to an exemplary embodiment, external communication system 350 is configured for enabling communication between a user, an appliance, and a remote server or network 354. According to exemplary embodiments, gardening appliance 100 may communicate with a remote device 352 either directly (e.g., through a local area network (LAN), Wi-Fi, Bluetooth, etc.) or indirectly (e.g., via a network 354), as well as with a remote server (not shown), e.g., to receive notifications, provide confirmations, input operational data, select lighting conditions, receive notifications or data regarding abnormal growth conditions, etc.

In general, remote device 352 may be any suitable device for providing and/or receiving communications or commands from a user. In this regard, remote device 352 may include, for example, a personal phone, a tablet, a laptop computer, or another mobile device. In addition, or alternatively, communication between the appliance and the user may be achieved directly through an appliance control panel (e.g., control panel 170).

In general, network 354 can be any type of communication network. For example, network 354 can include one or more of a wireless network, a wired network, a personal area network, a local area network, a wide area network, the internet, a cellular network, etc. In general, communication with network may use any of a variety of communication protocols (e.g., TCP/IP, HTTP, SMTP, FTP), encodings or formats (e.g. HTML, XML), and/or protection schemes (e.g., VPN, secure HTTP, SSL).

External communication system 350 is described herein according to an exemplary embodiment of the present subject matter. However, it should be appreciated that the exemplary functions and configurations of external communication system 350 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

Now that the construction of gardening appliance 100 has been described according to exemplary embodiments, an exemplary method 400 of illuminating plants to correct abnormal growth conditions in a gardening appliance will be described. Although the discussion below refers to the exemplary method 400 of operating gardening appliance 100, one skilled in the art will appreciate that the exemplary method 400 is applicable to the operation of a variety of other gardening appliances and/or lighting assemblies.

Figure 11:
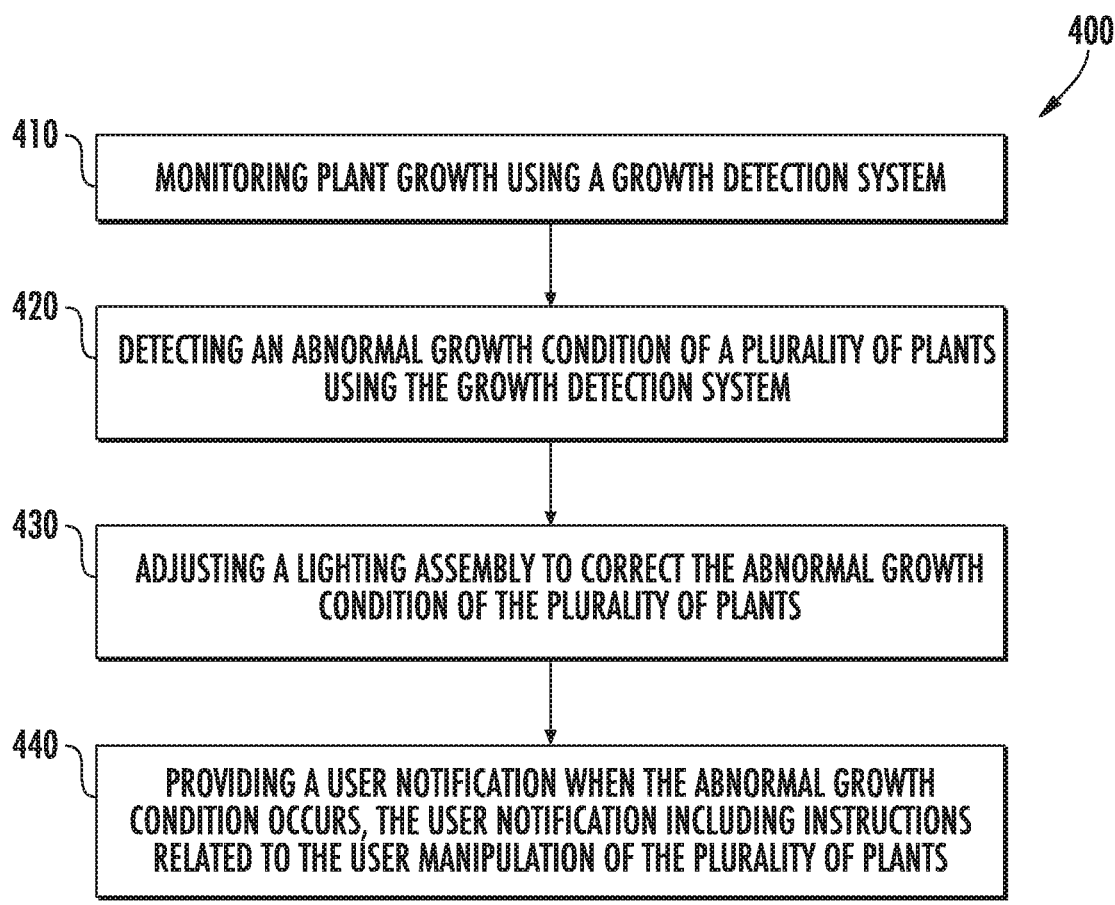
FIG. 11 provides a method of illuminating a grow chamber of an indoor gardening appliance according to an exemplary embodiment of the present subject matter.

Referring now to FIG. 11, method 400 includes, at step 410, monitoring plant growth using a growth detection system. In this regard, continuing the example from above, growth detection system 330 may include camera system 332 for monitoring the growth of plants 124 within grow chamber 122. Step 420 includes detecting an abnormal growth condition of the plurality of plants using the growth detection system. In this regard, controller 174 may monitor and analyze such growth to determine when an abnormal growth condition has occurred. For example, as explained above, the abnormal growth condition may occur when plants 124 grow beyond a predetermined radial distance or when the plants 124 fall out of a specified range for parameters such as roundness, sphericity, or perimeter-to-area ratio. Alternatively, growth detection system 330 may be configured for detecting void or bare regions within a plant 124 and adjusting the lighting to compensate for such voids. Other abnormal growth conditions are possible and within the scope of the present subject matter.

Step 430 includes adjusting a lighting assembly to correct the abnormal growth condition of the plurality of plants. For example, controller 174 may adjust lighting assembly 300 to illuminate regions of a particular plant 124 that are particularly bare of foliage or which are out of proportion with the surrounding plant growth. In this regard, for example, if a particular plant 124 is unusually elongated when a round or plant is preferred, lighting assembly 300 may be adjusted to illuminate the sides of plant while leaving a tip of plant 124 unilluminated or illuminated in a color that does not promote fast plant growth to balance out plant growth for a healthier, rounder plant 124.

Under certain conditions, abnormal growth conditions should be brought to a user's attention, such as when correction using lighting assembly 300 is ineffective or inefficient. Under such situations, step 340 may include providing a user notification when the abnormal growth condition occurs. According to exemplary embodiments, the user notification may be provided through a control panel 170, to a remote device 352, or may be communicated in any other suitable manner. In addition, this notification may include suggestions on pruning, adding or removing plants, hydration schedules, illumination schedules, or any other plant care and/or maintenance activities.

FIG. 11 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 400 are explained using gardening appliance 100 as an example, it should be appreciated that these methods may be applied to the operation of any gardening appliance or lighting assembly having any other suitable configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
    a liner positioned within a cabinet and defining a grow chamber;
    a grow module mounted within the liner and defining a root chamber;
    a plurality of apertures defined through the grow module, the plurality of apertures being configured for receiving a plurality of plant pods that grow a plurality of plants;
    a growth detection system for detecting plant growth of the plurality of plants;
    a lighting assembly for selectively illuminating one or more portions of the plurality of plants; and
    a controller in operative communication with the growth detection system and the lighting assembly, the controller being configured for:
        detecting an abnormal growth condition of the plurality of plants using the growth detection system, wherein the abnormal growth condition comprises at least one of a void or bare region within one of the plurality of plants, an imbalanced plant growth, or growth of a plant within a predetermined distance from a pinch point; and
        adjusting the lighting assembly to correct the abnormal growth condition of the plurality of plants, wherein adjusting the lighting assembly comprises illuminating only a particular portion of the plurality of plants.

2. The gardening appliance of claim 1, wherein the abnormal growth condition occurs when the plurality of plants grow beyond a predetermined radial distance measured from a central axis of the grow module.

3. The gardening appliance of claim 1, wherein the abnormal growth condition occurs when a roundness, a sphericity, or a perimeter-to-area ratio of the plurality of plants drops below a predetermined threshold.

4. The gardening appliance of claim 1, wherein the controller is further configured for:
    providing a user notification when the abnormal growth condition occurs.

5. The gardening appliance of claim 4, wherein the user notification includes instructions related to user manipulation of the plurality of plants.

6. The gardening appliance of claim 5, wherein the user manipulation comprises pruning or removing one or more of the plurality of plants, and wherein the lighting assembly is configured for illuminating areas needing pruning.

7. The gardening appliance of claim 1, wherein the growth detection assembly comprises a camera system.

8. The gardening appliance of claim 7, wherein the camera system comprises multiple cameras spaced apart within the grow chamber for monitoring plant growth from multiple angles.

9. The gardening appliance of claim 1, wherein the growth detection assembly comprises a proximity detection system.

10. The gardening appliance of claim 9, wherein the proximity detection system comprises one or more of a sonar system, a laser imaging, detection, and ranging (LiDAR) system, a radar system, or another acoustic distance sensor.

11. The gardening appliance of claim 1, wherein the growth detection assembly monitors a growth rate of the plurality of plants and the lighting assembly is adjusted to increase or decrease the growth rate.

12. The gardening appliance of claim 1, wherein the lighting assembly is operated according to a first lighting schedule for a first illumination region of the grow chamber and a second lighting schedule for a second illumination region of the grow chamber.

13. The gardening appliance of claim 1, wherein the lighting assembly is selectively operated to simulate environmental lighting.

14. The gardening appliance of claim 1, wherein the lighting assembly comprises a plurality of light emitting diodes.

15. A method of illuminating a plurality of plants within a gardening appliance, the method comprising: providing a gardening appliance, comprising: a liner positioned within a cabinet and defining a grow chamber; a grow module mounted within the liner and defining a root chamber; a plurality of apertures defined through the grow module, the plurality of apertures being configured for receiving a plurality of plant pods that grow a plurality of plants; a growth detection system for detecting plant growth of the plurality of plants; a lighting assembly for selectively illuminating one or more portions of the plurality of plants; and a controller in operative communication with the growth detection system and the lighting assembly;
    the controller detecting an abnormal growth condition of the plurality of plants using the growth detection system, wherein the abnormal growth condition comprises at least one of a void or bare region within one of the plurality of plants, an imbalanced plant growth, or growth of a plant within a predetermined distance from a pinch point; and
    the controller adjusting the lighting assembly to correct the abnormal growth condition of the plurality of plants, wherein adjusting the lighting assembly comprises illuminating only a particular portion of the plurality of plants.

16. The method of claim 15, wherein detecting the abnormal growth condition of the plurality of plants comprises:
    determining that the plurality of plants have grown beyond a predetermined radial distance measured from a central axis of a grow module.

17. The method of claim 15, wherein detecting the abnormal growth condition of the plurality of plants comprises:
    determining that a roundness, a sphericity, or a perimeter-to-area ratio of the plurality of plants has dropped below a predetermined threshold.

18. The method of claim 15, further comprising:
    providing a user notification when the abnormal growth condition occurs, the user notification including instructions related to the user manipulation of the plurality of plants.

19. The method of claim 15, wherein the growth detection assembly comprises a camera system for monitoring plant growth from multiple angles.

20. The gardening appliance of claim 15, wherein the growth detection assembly comprises a proximity detection system.

* * * * *